No. 894,187. PATENTED JULY 28, 1908.
P. A. CASSIDY & F. L. PAYNE.
WIREMAN'S SOLDERING TOOL.
APPLICATION FILED JULY 29, 1907.
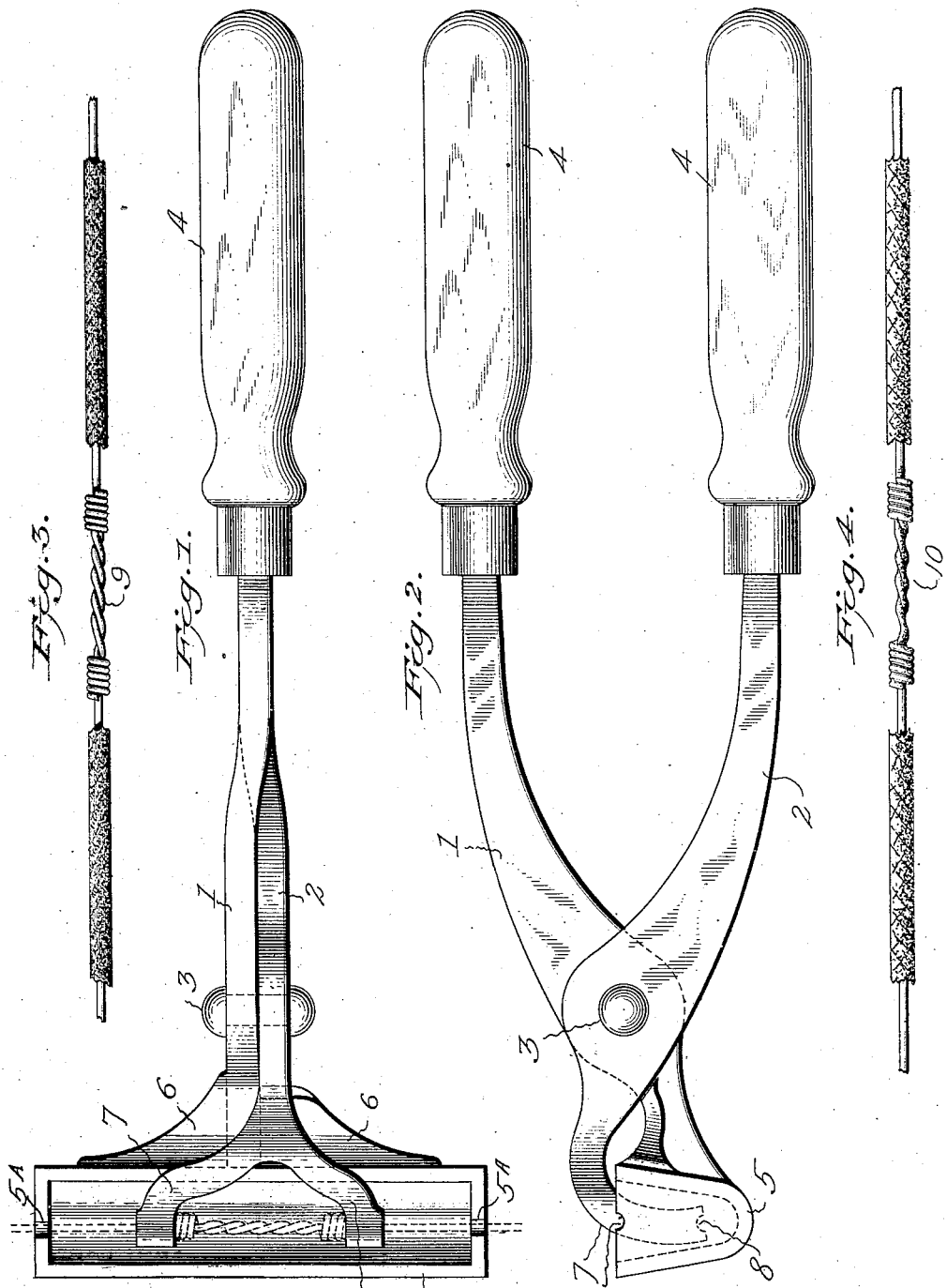

UNITED STATES PATENT OFFICE.

PATRICK A. CASSIDY AND FRANK L. PAYNE, OF ENGLEWOOD, COLORADO.

WIREMAN'S SOLDERING-TOOL.

No. 894,187.   Specification of Letters Patent.   Patented July 28, 1908.

Application filed July 29, 1907. Serial No. 386,012.

*To all whom it may concern:*

Be it known that we, PATRICK A. CASSIDY and FRANK L. PAYNE, citizens of the United States of America, residing at Englewood, county of Arapahoe and State of Colorado, have invented a new and useful Wireman's Soldering-Tool, of which the following is a specification.

Our invention relates to improvements in wireman's soldering tools.

The object of the invention is to provide a device of this character, which is adapted for use in all classes of wiring, and more particularly in inside electric wiring, where requirements make it necessary that all joints formed in the wires shall be soldered to give additional strength, and thus prevent accidents due to the parting of the wires at the said joints, and to this end the invention consists in providing an implement consisting of a solder-holding trough, and a wire gripping jaw, pivoted together in such a manner that a jointed section of wire may be gripped and pressed into the said trough, which is provided with molten solder, and the said joint quickly soldered, without risk of injury to the attendant.

In the accompanying drawings, forming part of this application, Figure 1, is a plan view of the improved soldering tongs. Fig. 2, is a side view thereof. Fig. 3, is a view showing the joint where two sections of wire are united. And Fig. 4, is a similar view showing the joint incased in a casing of solder.

Referring to the accompanying drawings, the numeral 1, indicates one arm of the tool, and 2 the other arm, and these arms are pivotally connected adjacent to their forward ends, in the same manner as a pair of ordinary scissors, by a pin 3. These arms diverge from the pivotal point rearward, and their rear ends are provided with handles 4, the space between the handles, caused by the divergence of the arms, affording ample room for the hands in grasping the handles. Upon the forward end of the arm 1, is formed a receptacle or trough 5, which is preferably of the form shown, being substantially U-shaped in cross section, and of a convenient length and depth, and integral webs 6, extend from the handle to the trough and serve to thoroughly brace the trough. The ends of the trough are notched on their edges as shown in 5ᴬ. The forward end of the arm 2, is forked, as shown, and the two members or fingers 7, thus formed, are bent outward and downward, and each finger has a groove 8, in its end, which grooves extend parallel with the length of the trough. The fingers are designed to press upon and hold a wire within the trough, as will presently appear, and are so arranged with respect to the trough that when the handles of the tool are brought near together, as shown in Fig. 2, the said fingers will extend into the trough, to within a short distance from its bottom, and in operating the tool, the handle or arm 1, is held in one hand, and the arm 2 is manipulated with the other hand.

In inside electric wiring, it is required that wherever the ends of wires have been connected, as shown at 9 in Fig. 3, the joint thus formed must be further strengthened by soldering. At present, this operation is done by hand, and is necessarily slow and laborious, besides rendering the person thus employed liable to injury. The improved tool is adapted to accomplish the work much more speedily and effectively than can be done by hand, and at the same time obviate the risk of injury.

In the practical operation of our device, the handles of the tool are grasped in the manner previously mentioned, and the trough 5, is filled with molten solder. A wire, having a joint 9, as shown in Fig. 3, is then laid upon the top of the trough so as to rest in the notches 5ᴬ, with the joint beneath the grooved ends of the fingers 7, as illustrated in dotted lines in Fig. 1, and the handles are drawn towards each other, which forces the fingers 7, with the jointed portion of the wire, into the trough and beneath the surface of the molten solder therein, which will adhere to the joint and form a coating or casing around it, similar to that shown at 10 in Fig. 4, which will prevent the parting of the wires at the said joint, and thus prevent accident.

Having described the invention, what we claim and desire to secure by Letters Patent, is:

1. A wireman's soldering tool, comprising a pair of hand gripping handles which are pivotally connected at a point between their ends; a hot solder holding trough on the extremity of one handle; and a pair of fingers on the end of the other handle above said trough arranged to be moved to move into and out of said trough.

2. A wireman's soldering tool, comprising a pair of handles which are pivotally united at a point between their ends; a fluid solder holding trough on one of the handles; and a pair of curved fingers on the end of the other handle arranged to be moved in and out of said trough when said handles are manually moved to and from each other, said fingers having grooves in their ends.

3. A wireman's soldering tool for soldering spliced electric wires, comprising a pair of hand grasping handles pivotally connected together at a point intermediate of their ends; a trough on the extremity of one handle, having closed ends and arranged and adapted to hold hot fluid solder; a pair of curved fingers on the other handle above said trough, having grooves in their ends parallel with the length of the trough and arranged to engage a spliced wire, said fingers being adapted to enter the trough when the handles are moved towards each other, and bend said wire into the hot fluid solder in said trough.

4. In a wireman's wire soldering tool, a pair of tong handles on said tool pivotally connected at a point on one side of the center of their length; a trough inclosed at its sides and ends to hold a body of fluid solder on the shorter end of one of the said handles; integral brace webs extending between said handle and trough; a pair of curved fingers on the other handle above the trough, and adapted to enter the trough when the handles are brought towards each other, a recess in the ends of each of said fingers adapted to engage the wire to be soldered and force it into the fluid solder within said trough, the longer ends of said handles being formed to diverge from the point of their pivotal connection, and being provided with handles.

5. In a wireman's soldering tool for soldering spliced joints in electric wires, a pair of arms pivotally connected in the manner of a pair of shears, having handles on their longer ends; a molten solder holding trough provided with closed end portions formed on the shorter end of one of the arms, while the shorter end of the other arm is bifurcated to form a pair of independent fingers, the ends of which are provided with grooves adapted to engage a spliced joint of an electric wire, said fingers being arranged and adapted to move into and out of said trough when said arms are moved to and from each other, and to engage said spliced portion of said wire and force it into the molten solder in said trough when the arms are moved towards each other.

In testimony whereof we affix our signatures in presence of two witnesses.

PATRICK A. CASSIDY.
FRANK L. PAYNE.

Witnesses:
G. SARGENT ELLIOTT,
GRACE P. LINDSLEY.